Jan. 5, 1960 W. T. LIVERMORE 2,919,603
FLUID PRESSURE CONTROL SYSTEM FOR AUTOMATIC TRANSMISSIONS
Filed June 15, 1953 2 Sheets-Sheet 2
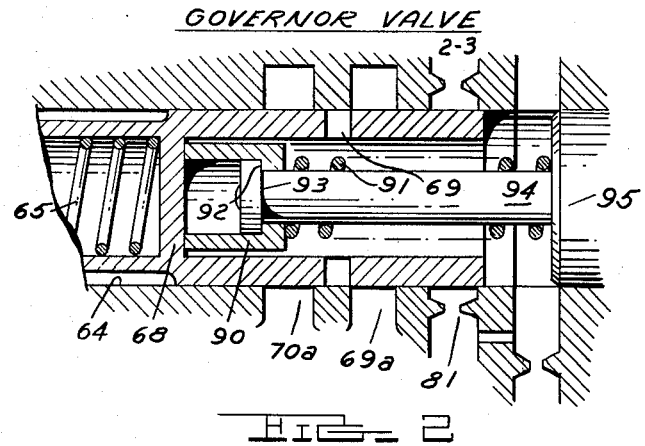
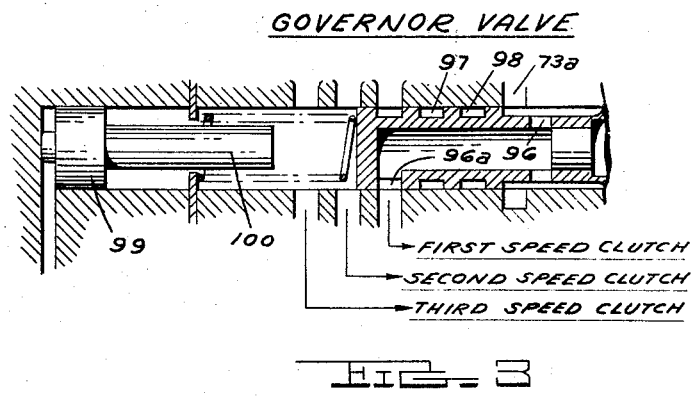
INVENTOR.
WILLIAM T. LIVERMORE
BY
ATTORNEYS

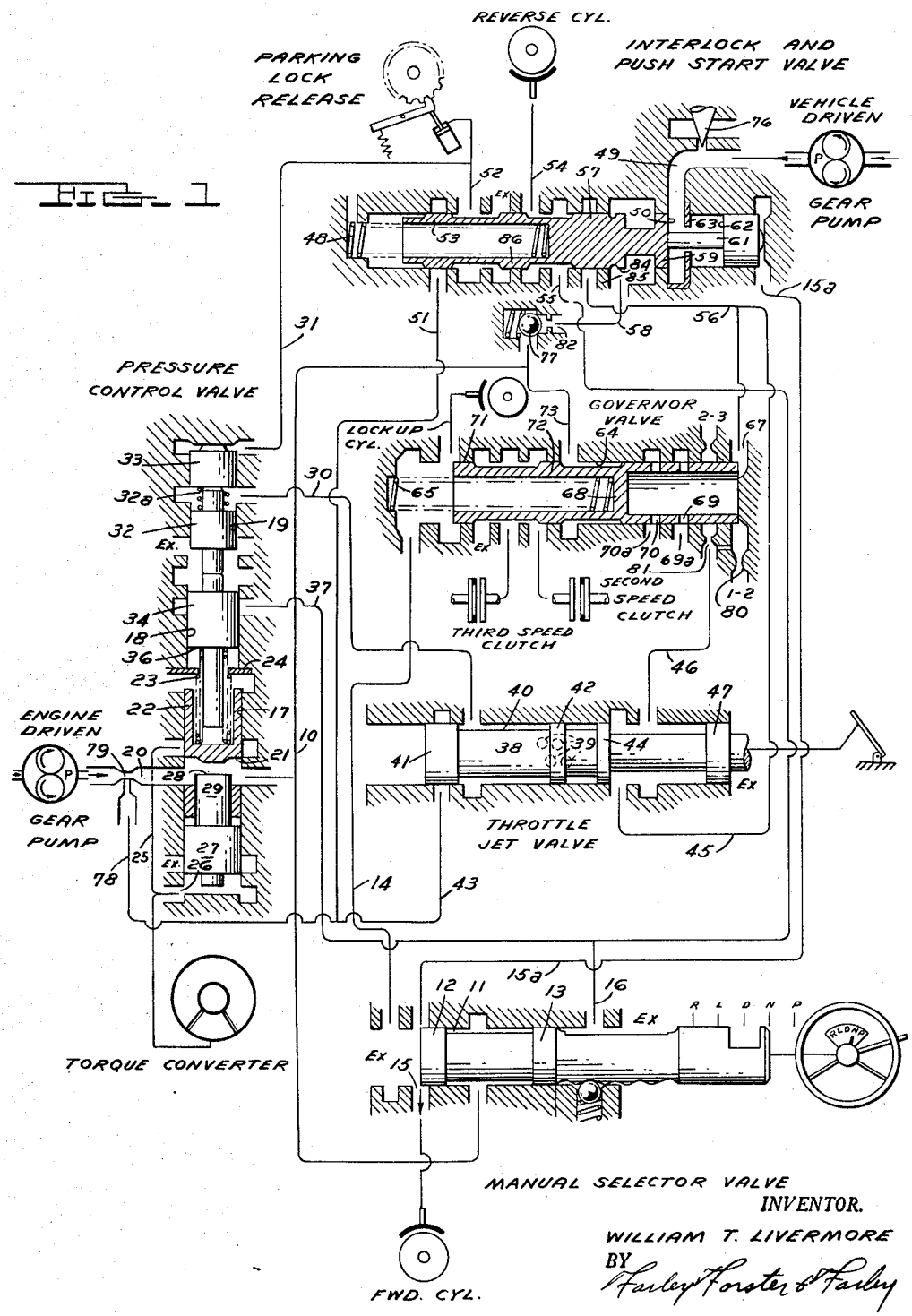

United States Patent Office 2,919,603
Patented Jan. 5, 1960

2,919,603

FLUID PRESSURE CONTROL SYSTEM FOR AUTOMATIC TRANSMISSIONS

William T. Livermore, Grosse Pointe Farms, Mich.

Application June 15, 1953, Serial No. 361,789

25 Claims. (Cl. 74—645)

This invention relates to an improved fluid pressure control system for automotive vehicle automatic transmissions.

The control system disclosed herein is generally applicable to a step-shift automatic transmission, such as disclosed in my copending application Serial No. 117,647, now Patent No. 2,737,824 which may include a fluid coupling or torque converter in series with a transmission gear set having a plurality of ratios successively engaged through the application and/or release of fluid pressure actuated friction coupling elements. In general, the control system comprehends the use of engine driven and vehicle driven fluid pressure pumps and includes provisions for regulating available pressures for effecting coupling engagement in accordance with varying torque requirements; for manually selecting forward and reverse drive ranges, neutral, and a parking lock; for automatically controlling shift points in accordance with differential effects of vehicle speed and throttle opening; for accommodating push starting of the engine; and for safeguarding against manual shifting above predetermined vehicle speeds and against engaging the parking lock when the vehicle is in motion.

The present control system is characterized primarily by the elimination of conventional centrifugal hydraulic or mechanical governors as shift control elements varying with vehicle speed and the replacement thereof with a simple nonrotating governor valve adapted to uncover progressive orifice areas for exhausting fluid delivered by the vehicle driven pump, utilizing the delivery versus vehicle speed characteristics of the pump and the pressure head built up thereby against varying orifice areas to effect desired shift control characteristics. The control system is more particularly characterized by the combination in a single such governor valve of provisions for controlling shift points in accordance with vehicle speed, for directly opening and/or exhausting ports to the respective fluid pressure actuated friction coupling elements, for avoiding "hunting" at the shift points and producing positive rapid movement of the valve to its successive shift positions, for automatically incorporating a "hysteresis" effect to avoid overly frequent up and down shifts at slightly varying vehicle speeds, and for altering the vehicle speeds at which shifts occur in accordance with throttle opening through fluid pressure orifice means responsive to throttle position.

Additional novel features of the present control system include unique means for regulating fluid coupling or torque converter pressure at a fractional value of the line pressure available for actuating frictional coupling elements; for maintaining relatively low line pressure in effecting closed throttle shifts between neutral, forward and reverse drive to avoid the unpleasant jar or bump conventionally incurred; for maintaining a sustained relatively high line pressure while the transmissions remains in drive position even though the vehicle is stopped or the throttle closed; for establishing multiplied line pressure to hold reverse drive friction coupling means against the high reaction torque developed in reverse when the throttle is opened; and for reducing normal forward drive coupling pressure at speeds above those at which there is substantial torque multiplication by means of the converter, the holding requirements therefor falling off, in order to facilitate smooth shifting at such speeds as well as to reduce the work load of the engine pump.

Accordingly, the principal object of the present invention is to provide a simple nonrotating governor valve construction adapting the speed responsive discharge of a vehicle driven pump through progressive orifice areas to the direct control of shift points.

Another object is to provide means for producing positive step movement of such valve to its successive shift positions.

Another object is to provide means of hysteresis effect to prevent downshifting at or near the same vehicle speed as upshifting.

Another object is to produce both such step movement of the shift governor valve and such hysteresis effect hydraulically through the use of orifice ports.

Another object is to render such shift governor valve differentially responsive to throttle opening.

Another object is to produce such differential throttle opening effect hydraulically through the use of progressive orifice ports uncovered coordinately with throttle opening.

Another object is to provide for a manually controlled "kickdown" shift in response to accelerator depression beyond the wide-open throttle position through the use of additional exhaust orifice ports.

Another object is to render the shift governor valve responsive to a manual downshift which will hold the transmission in a low speed drive range.

Another object is to incorporate means in said governor valve for normal starting in a ratio above lowest speed drive ratio.

Another object is to provide an accelerator responsive valve incorporating means coordinated with such governor valve for producing the various throttle and accelerator responsive functions mentioned above.

Another object is to render such accelerator responsive valve effective to control line pressure available to engage friction coupling elements.

Another object is to provide improved means for regulating fluid coupling or torque converter pressure at a fractional value of line pressure.

Another object is to provide pressure control means for avoiding shock engagement of forward or reverse friction coupling elements upon a manual shift to forward or reverse.

Another object is to provide means for maintaining a normal line pressure as long as the transmission is left in drive range after the throttle has once been opened.

Another object is to provide means for multiplying line pressure in reverse drive only after the throttle has been opened.

Another object is to provide means for modifying line pressure in response to engine speed.

Another object is to adapt the control system to provide for push starting of the engine.

Another object is to provide means for preventing a manual shift to reverse drive at forward vehicle speeds above a predetermined speed.

Another object is to provide a manually operated parking lock with automatic means for preventing engagement while the vehicle is moving.

These and other objects will be more readily apparent from the following detailed description of a preferred embodiment of my invention and by reference to the drawings forming a part hereof wherein:

Fig. 1 is a schematic diagram of a preferred hydraulic control system showing the various valves employed and their interrelation.

Fig. 2 is a modified governor valve corresponding to that shown in Fig. 1 but incorporating means adapted to provide normal starting in second speed.

Fig. 3 is a modified governor valve corresponding to that shown in Fig. 1 but adapted to a transmission wherein successive shifts require a transfer of engagement between separate fluid pressure actuated friction coupling elements rather than the engagement or release of a single fluid pressure actuated friction coupling element.

Referring to the drawings, Fig. 1 discloses a specific adaptation of the control system to an automatic transmission of a type such as currently used in Studebaker passenger cars wherein a torque converter is coupled with a three-speed planetary gear set. In such transmission a first speed forward drive may be effected by introducing pressure to a "Forward Cylinder" which engages a friction band element. Second and third speed drives may be effected by the successive fluid pressure application of a "Second Speed Clutch" and a "Third Speed Clutch," one-way overrunning clutch means being employed which avoid the necessity of releasing fluid pressure actuated friction coupling elements in effecting successive upshifts.

With such arrangement, first and second speed drives are free-wheeling while third speed is a direct two-way drive between engine and propeller shaft. In order to provide two-way drive in first speed, as for obtaining engine braking in descending a hill, a fluid pressure "Lockup Cylinder" may be actuated to engage a second friction band element.

Reverse drive may be established by introducing pressure to a "Reverse Cylinder" which applies a reverse friction band element, all other friction elements mentioned above being released.

Since the Studebaker type of gear train is well known in the art and since the specific construction of the transmission elements is not necessary to an understanding of the present control, no showing or detailed description thereof is included herein.

As shown in Fig. 1, a spool type "Manual Selector Valve" is movable to five positions, "R," "L," "D," "N," and "P," corresponding to reverse, low, drive, neutral, and parking. When the "Manual Selector Valve" is in neutral position as shown, fluid pressure from a main supply line 10 communicating with a necked portion 11 of the "Manual Selector Valve" is blocked by lands 12 and 13 from communication with passage 14 leading to the left end of the "Governor Valve," passage 15 leading to the "Forward Cylinder," passage 15a leading to the "Interlock Valve," and passage 16 leading to the "Pressure Control Valve" and to the "Reverse Cylinder" through the "Interlock Valve," such passages being respectively exhausted as indicated.

In drive position, pressure from line 10 communicates with the "Forward Cylinder" and "Interlock Valve" passages 15 and 15a, the other passages remaining exhausted. In low speed position, pressure from line 10 communicates with all of such passages except reverse passage 16 which remains exhausted. In reverse position pressure from line 10 communicates with passage 16 leading to the "Interlock Valve" and "Reverse Cylinder" while passages 14 and 15 are exhausted. In parking position, as in neutral, passages 14, 15, 15a and 16 are all exhausted.

The "Pressure Control Valve" has several coaxial cylindrical piston elements movable along the main bore 17 and bores 18 and 19 of successively smaller diameters. Fluid pressure from an "Engine Driven Gear Pump" enters the "Pressure Control Valve" through passage 20 and passes freely therethrough to the main pressure line 10. When pressure builds up on the end 21 of a hollow piston element 22, against the load of a spring 23 reacting against a fixed stop 24, to a relatively low pressure value which may be in the order of twenty-five pounds per square inch, passage 25 leading to the "Torque Converter" is uncovered. Pressure from the "Converter" passage 25 communicates through a branch passage 26 to the end of a plunger 27 moving such plunger up to uncover an exhaust port when the "Converter" pressure overbalances line pressure acting on the end 28 of a smaller plunger 29 thereby establishing a converter pressure at a fractional value of line pressure proportional to the differential areas of the plungers 27 and 29.

Whenever line pressure is admitted either through passage 30 or passage 31, as hereinafter described, to act upon the upper end of a small plunger 32 or plunger 33 moving in the smallest bore 19, the load of spring 23 for establishing initial pressure in the main supply line 10 will be supplemented by line pressure times the area of the bore 19 acting through piston 33 and/or piston 32, the adjoining piston 34 and the rod extension 35 thereof, the lower end of which rod is adapted to engage the piston 22 moving it to cover the passage 25 when the shoulder 36 engages the stop 24. Accordingly, line pressure will thereupon build up until such pressure times the difference in area between bore 17 and bore 19 overbalances the load of spring 23. The differential areas of the bores 17 and 19 relative to the load of spring 23 may be chosen to provide a normal line pressure, such as in the order of eighty pounds per square inch, adequate to hold the torque loads encountered in the fluid pressure actuated friction coupling elements during acceleration in forward drive ratios. A spring 32a prevents piston 33 from blocking passage 30 in the absence of actuating pressure in line 31.

When line pressure is introduced into the passage 37 associated with reverse drive and the piston 34 is initially depressed by pressure above the piston 32 to establish communication between the line 37 and the top of the piston 34, a still higher loading of the piston 22 is effected equal to the area of the bore 18 times the effective line pressure which will cause such line pressure to build up until line pressure times the differential area between the bores 17 and 18 overbalances the load of spring 23. Such differential area may be dimensioned to provide a suitable line pressure for holding the high torque involved at the fluid pressure actuated friction coupling element for acceleration in reverse gear drive as, for example, in the order of 160 pounds per square inch.

The "Throttle Jet Valve" is a spool valve moving axially in a cylindrical bore 38 in response to accelerator actuation. The valve is shown in a released accelerator position corresponding to closed throttle. A series of orifice exhaust ports 39 communicate with such bore and in the position of the "Throttle Jet Valve" shown serve to exhaust pressure in the line 30 through the necked portion 40 of the valve between sealing lands 41 and 42. Depression of the accelerator serves to move the "Throttle Jet Valve" to the left and the initial movement serves to close off the orifice exhaust jets communicating with passage 39 and open such passage to fluid pressure from the engine driven pump through line 43. During additional movement of the "Throttle Jet Valve" through a predetermined initial throttle opening, the exhaust orifices 39 are sealed off between lands 42 and 44 after which progressive throttle opening progressively uncovers increasing orifice discharge area to the right of land 44 communicating with passages 45 and 46. When the "Throttle Jet Valve" reaches a position corresponding to wide-open throttle, all of the exhaust orifices 39 are open to passage 45 while an additional accelerator movement beyond a wide-open throttle position moves the land 47 to a position intermediate the ports associated with lines 45 and 46 thereby opening the passage 46 to unrestricted exhaust at the right of the land 47.

The "Interlock and Push Start Valve" is of spool construction having sealing lands moving in a cylindrical bore of constant diameter. The left end of the valve is recessed to accommodate a spring 48 urging the valve to its right-hand position as shown. Fluid delivered from a "Vehicle Driven Gear Pump" communicates through passage 49 with the right end 50 of such valve whenever the vehicle is moving. When such valve is in its right-hand position as shown, any pressure from the "Engine Driven Pump" in passage 43 and branch passage 51 is blocked off from the "Parking Lock Release" passage 52 and "Pressure Control Valve" passage 31 by the sealing land 53. The "Reverse Cylinder" passage 54 is open to communication with the reverse passage 55. The "Governor Valve" passage 56 is blocked off by sealing land 57 from the "Vehicle Pump" while passage 49 is sealed off from the "Engine Pump" passage 58 by sealing land 59.

Progressive movement of the "Interlock Valve" to the left first opens communication between passages 51 and 52; next opens communication between the vehicle pump and engine pump passages 49 and 58; then opens orifice flow between a flat 84 and bore land 85 into the "Governor" passage 56 while the "Reverse Cylinder" passage 54 still communicates with the reverse passage 55; then blocks off communication between passages 54 and 55 and opens passage 54 to exhaust; and finally opens unrestricted communication of "Vehicle Pump" fluid with the "Governor" passage 56. When the "Manual Selector" valve is in either of its forward drive position, line pressure from the main line 10 is admitted through passage 15a to the right end of plunger 60 and when such line pressure is sufficient to overcome spring 48, the plunger rod 61 moves the "Interlock Valve" to its full left-hand position where a shoulder 62 engages a fixed stop 63 whereupon the various passages will be in the last condition described above. The plunger rod 61 is not attached to the "Interlock Valve" but is merely adapted to actuate such valve through pressure contact.

The "Governor Valve" is a cylindrical spool valve which is hollow at both ends and moves axially in a bore 64 of constant diameter. A spring 65 urges the valve to the right and fluid from passage 56 and port 67 associated therewith communicates with the hollow right end, a solid wall 68 being provided between the internal hollow portions. When the "Governor Valve" is in its right-hand position as shown, the "Lockup Cylinder" communicates with passage 14, the "Second" and "Third Speed Clutch" passages are exhausted, and fluid pressure in passages 56 and 67 communicates with the "1–2" exhaust orifice as well as additional exhaust orifices 69 and 70 in the side wall of the "Governor Valve" and aligned exhaust ports 69a and 70a communicating with the bore as shown. Initial movement of the "Governor Valve" toward the left will move the left margin of each of the exhaust orifices 69 and 70 to the left margin of their associated exhaust ports at which point the "Lockup Cylinder" port still communicates with line 14 and the "Second Speed Clutch" port still communicates with exhaust. Further movement will cause the sealing lands 71 and 72 to block off the "Lockup Cylinder" passage from passage 14, and the "Second Speed Clutch" passage from exhaust at which dead center position the respective orifices 69 and 70 will be approximately one-half closed to their exhaust ports 69a and 70a. Further movement will operate to close orifices 69 and 70 and open the "Lockup Cylinder" port to exhaust and the "Second Speed Clutch" port to pressure port 73. Further movement will open communication between the "Governor" pressure port 67 and the "2–3" exhaust port past the end of the "Governor Valve"; next the exhaust orifice 69 will open fully into the exhaust port 70a and continue across such port reaching the marginal left-hand edge while the "Third Speed Clutch" port continues to communicate with exhaust; the land 72 will next reach a dead center position over the "Third Speed Clutch" port when the orifice 69 is again approximately one-half closed and continued movement closing orifice 69 will open the "Third Speed Clutch" port to pressure line 73. Before the "Governor Valve" reaches the end of its travel to the left, the right end of the valve will uncover exhaust port 69a.

The remaining elements of the control system include an adjustable orifice bleed 76 to compensate for manufacturing tolerances in the "Vehicle Pump"; a one-way check valve 77 for admitting pressure from the "Vehicle Pump" through passage 58 into main pressure line 10 when the "Engine Pump" is not operating and for blocking such communication when the engine is running; and a restricted venturi passage 79 in the "Engine Pump" delivery line 20 connected through passage 78 to branch passages 43 and 51 effective to produce a pressure in passage 78 decreasing appreciably below normal line pressure in passage 10 when the engine is running at high speed and the flow through the venturi is high.

*Operation*

Considering first the normal operation of the control system shown in Fig. 1, the "Parking Lock" is manually released by linkage, not shown, when the "Manual Selector Valve" is moved from parking to neutral position. The engine of the car is started with the "Manual Selector Valve" in neutral position as shown whereupon fluid pressure from the "Engine Driven Pump" builds up in the main supply line 10 to a low initial value determined by spring 23, which may be in the order of 25 pounds per square inch, at which point the "Pressure Control Valve" piston 22 uncovers the port 25 and fractional pressure in the "Converter" line 26 moves the piston 27 to exhaust the discharge from the "Engine Driven Pump." At this time the "Interlock Valve" is in the closed position as shown under the pressure load of spring 48, the "Governor Valve" is closed by spring 65 as shown, the "Throttle Jet Valve" is in its closed position as shown, and all friction coupling elements associated with the transmission are released.

When the "Manual Selector Valve" is moved to drive position for normal starting, the relatively low line pressure is admitted to the "Forward Cylinder" port 15 engaging the associated friction coupling element for first speed drive smoothly and without the conventional jolt frequently encountered where a normal high line pressure is initially employed to establish engagement of the idling low speed drive gear train. Prior to opening the throttle, slip in the converter will permit the vehicle to remain stationary with the transmission gearing engaged for low speed drive.

When the throttle is now opened to start the vehicle in motion, pressure from line 43, which at low engine speeds is substantially equal to line pressure, is admitted through the "Throttle Valve" to line 30 increasing the load on the "Pressure Control Valve" to establish normal line pressure, such as in the order of 80 pounds per square inch, adequate to hold the low speed friction coupling element fully engaged and engage succeeding friction elements under any acceleration. As the "Pressure Control Valve" builds line pressure up to its normal operating value, such pressure (admitted to line 15a when the "Manual Selector Valve" is in drive position) becomes great enough to actuate the piston 60 associated with the "Interlock Valve" against the load of spring 48, which may be of an order equivalent to 40 pounds per square inch, thereby moving the "Interlock Valve" to a position where "Vehicle Pump" discharge has unrestricted communication with the "Governor" pressure line 56.

As the vehicle accelerates in low speed drive, the increasing volume of fluid delivered by the vehicle pump is discharged through the "1–2" orifice, which communicates at all times with port 67 at the end of the "Governor Valve," as well as through exhaust orifices 69 and 70 thereby building up a pressure acting on the right end of the "Governor Valve" which increases with vehicle speed. For normal acceleration the throttle will be opened to some intermediate value such as will uncover to the right of the land 44 a portion of the exhaust areas provided by the series of orifice holes 39, thereby providing a pressure head acting on the right end of the governor valve differentially responsive to both vehicle speed and the degree of throttle opening, such pressure head increasing with vehicle speed and decreasing with throttle opening. As such pressure moves the "Governor Valve" toward the left against the increasing pressure of the constant rate spring 65, such movement will proceed steadily with increasing pressure until the left edges of the orifices 69 and 70 reach the left terminal margins of the associated exhaust ports 69a and 70a, at which point the land 72 will still permit open communication between the "Second Speed Clutch" port and the associated exhaust port. Since the continued movement of the "Governor Valve" will now be accompanied by a reduction in the effective discharge areas of the orifices 69 and 70, a regenerative sudden rise in governor pressure will result providing a rapid or "flip" movement of the governor valve to a position where the "2–3" orifice is uncovered by the end of the "Governor Valve" and the exhaust orifice 69 partially opens to the exhaust port 70a. Such flip movement will carry the land 72 through the dead center position of alignment with the "Second Speed Clutch" port, which occurs when the orifices 69 and 70 are approximately one-half closed, and to a position establishing wide-open communication between the "Second Speed Clutch" port and the pressure port 73, thereby effecting second speed drive without delay or "hunting" at the marginal shift point.

At this point the land 72 of the "Governor Valve" will lie in a position intermediate the "Second" and "Third Speed Clutch" ports. In order to accomplish such "flip" action, it will be apparent that the effective increase in acting governor pressure resulting from the closing of orifices 69 and 70 must be greater than the accompanying increase in the load of the constant rate spring 65, and that in order to stop the "Governor Valve" with its land intermediate the "Second" and "Third Speed Clutch" ports, the effective area of the "2–3" orifice and orifice 69 uncovered by the "Governor Valve's" movement to second speed position must be large enough to arrest further movement of the "Governor Valve" pending a further increase in vehicle speed to a value appropriate for a further upshift.

As the vehicle speed continues to increase in second speed drive, progressive movement of the "Governor Valve" will bring the orifice 69 into full registration with the exhaust port 70a and near the end of the second speed drive position of the "Governor Valve," discharge of "Vehicle Pump" pressure will take place through the combined areas of the "1–2" orifice, the "2–3" orifice and the flip orifice 69 discharging through exhaust port 70a as well as through any portion of the orifices 39 uncovered with throttle opening. As the vehicle speed and throttle opening approach values requiring a "2–3" shift, the left margin of the flip orifice 69 will reach the left terminal margin of the exhaust port 70a at which point the land 72 will still permit open communication between the "Third Speed Clutch" port and associated exhaust port, and the succeeding movement of the "Governor Valve" will operate to close off the exhaust orifice 69 producing a further flip movement of the valve to third speed position whereat pressure port 73 will communicate openly with the "Third Speed Clutch" port. Further movement of the "Governor Valve" beyond third speed position will now be arrested by the uncovering of the exhaust port 69a by the right end of the "Governor Valve," which opening is sufficient to discharge the entire delivery of the "Vehicle Pump" at maximum car speed without appreciable rise in governor pressure. In a typical installation, the "1–2" shift may be made to occur at 7 pounds per square inch governor pressure, the "2–3" shift at 20 pounds per square inch governor pressure, and the by-pass through exhaust port 69a at 25 pounds per square inch.

The "Governor Valve" similarly controls downshifts in the following manner: When, under decreasing governor pressure resulting from decreasing vehicle speed and/or increasing throttle opening, the right margin of the exhaust orifice 69 reaches the left margin of the exhaust port 70a, the "Third Speed Clutch" port is in communication with the pressure port 73. As the exhaust orifice 69 opens into the exhaust port 70a, the increasing discharge opening afforded thereby results in a sudden regenerative drop in governor pressure exceeding the drop in the load of spring 65 moving the valve rapidly to a position where exhaust orifice 69 is in full registration with exhaust port 70a in which position the "Third Speed Clutch" port is in open communication with the associated exhaust port thereby providing a "3–2" downshift. As the vehicle speed and governor pressure continue to drop, a movement of the "Governor Valve" is delayed by the closing of the exhaust orifice 69 by the land between the exhaust ports 69a and 70a and by the closing of flow through the "2–3" orifice by the right end of the "Governor Valve." When the governor pressure has dropped sufficiently to completely close off flow through the "2–3" orifice and the orifice 69, pressure in port 73 will continue to communicate with the second speed clutch port. However, as soon as the orifices 69 and 70 begin to open to the respective exhaust ports 69a and 70a, a rapid drop in governor pressure is again produced by the progressive opening of flow through such orifices resulting in a flip movement of the "Governor Valve" to a position for exhausting the "Second Speed Clutch" port thereby re-establishing low speed drive.

It will be noted that while the effective governor pressure immediately preceding a given upshift will be only slightly less than the effective governor pressure immediately preceding a corresponding downshift (by an amount approximately equal to the difference in the load of spring 65 in moving a distance equal to the flip orifice diameter) nevertheless the vehicle speeds under equal throttle opening at which such respective upshifts and downshifts occur will be substantially higher for the upshift than for the corresponding downshift due to the fact that one or both of the orifice areas 69 and 70 are effective to discharge fluid immediately preceding the upshift while being closed off immediately preceding the downshift. Thus, a desired "hysteresis" effect preventing unpleasant repeated upshifts and downshifts at or near the same vehicle speed is incorporated in the control by the same hydraulic means which produces the positive flip movement of the "Governor Valve" to definite speed ratio positions.

It will also be understood that in order to produce an approximately equal hysteresis effect for "1–2" and "2–1" shifts as for "2–3" and "3–2" shifts, a greater orifice area differential is required for the lower speed ratio shifts than for the higher due to the fact that the pressure head which builds up on an orifice varies with the square of the discharge therethrough and accordingly with the square of the vehicle speed where, as in the present case, the volume of discharge from the vehicle driven pump varies directly with vehicle speed. Therefore, in the present control, two orifices are employed to produce the desired hysteresis effect between both "2–3" and "3–2" shifts.

While for normal acceleration from a standstill, it is desirable to have increasing throttle opening delay upshifts, there is a certain range of initial small throttle opening wherein it is desirable to have shifts controlled by vehicle speed alone. Such initial range corresponds to the throttle opening required to maintain the vehicle in uniform motion under normal road-load conditions. For this reason the land 44 in the "Throttle Jet Valve" is positioned to prevent discharge through the orifices 39 until the "road-load" throttle opening is exceeded.

The orifices 39 are effective to impart the desired differential effect of throttle opening in controlling all normal upshifts and downshifts compatible with efficient combination of engine speed and power output. Nevertheless, there may be emergency requirements for maximum acceleration which make it desirable to be able to force a downshift to a lower speed ratio whenever useful added acceleration may be so obtained. The present control makes provision for such forced or "kickdown" shift in response to accelerator travel beyond wide-open throttle position by orifice outlets 80 and 81 which are provided apart from the orifices 39 due to the necessity for different orifice areas for controlling "3-2" and "2-1" kickdown shifts. Thus, when the accelerator is moved beyond wide-open throttle position, the passage 46 is connected to exhaust to the right of the land 47 rendering additional discharge orifices 80 and 81 effective to produce a "3-2" downshift, or additional discharge orifice 80 to effect "2-1" kickdown shifts.

It has been mentioned previously that when the engine is started in neutral a relatively low line pressure in the order of 25 pounds per square inch is established by spring 23 in the "Pressure Control Valve" which is effective to provide a smooth closed throttle engagement of the low speed gear train when the "Manual Selector Valve" is moved to drive position, such pressure building up to a normal line pressure in the order of 80 pounds per square inch when the "Throttle Jet Valve" is opened admitting pressure from passage 43 to passage 30 communicating with the top of piston 32 of the "Pressure Control Valve." It has also been noted that the establishment of such normal line pressure acting upon piston 60 of the "Interlock Valve" moves such valve against spring 48 to a position admitting discharge from the "Vehicle Pump" to communicate freely with the governor passage 56. At such time, pressure from line 51 will also be admitted to line 52 and branch line 31 communicating with the top of piston 33 at the top of the "Pressure Control Valve" thereby establishing a sustaining load on the "Pressure Control Valve" which will maintain normal line pressure notwithstanding the closing of the throttle and release of pressure from line 30. Thus, once the "Manual Selector Valve" has been moved to a drive position and the throttle initially opened, a normal line pressure will be maintained as long as the "Manual Selector Valve" remains in one of its forward drive positions.

However, since the line pressure required to hold the respective transmission friction elements fully engaged under wide-open throttle torque conditions diminishes when the engine reaches a speed above conversion in the torque converter, provision is made for reducing line pressure automatically in accordance with decreasing requirements through the use of the venturi passage 79 in the front pump discharge line 20 and associated connections 78 thereto which in turn delivers the pressure to the top of the "Pressure Control Valve" which ultimately controls the line pressure. Thus, as the delivery from the "Engine Driven Pump" grows with increasing engine speed, the increasing flow through the venturi 79 automatically reduces the effective pressure load on the top of the "Pressure Control Valve" thereby decreasing line pressure with decreasing requirements in order to facilitate smooth shifting at the higher speeds as well as to minimize the work load of the "Engine Driven Pump."

As previously mentioned, in order to provide means for holding the transmission in a two-way low speed drive, as for obtaining engine braking in descending a steep hill, provision is made in the low position of the "Manual Selector Valve" for admitting line pressure to line 14 and the left end of the "Governor Valve" which will at any speed under a predetermined maximum vehicle speed, such as forty miles per hour, overcome the "Governor Pressure" and move the "Governor Valve" to a first speed position at the same time introducing pressure to the "Lockup Cylinder" which is effective to establish two-way rather than a free wheeling first speed drive. In view of the danger of burning out transmission friction coupling elements by shifting to low speed drive when the vehicle is running above such a predetermined maximum speed, provision is incorporated for adapting the "Governor Pressure" to build up to a value exceeding line pressure above such maximum vehicle speed. This is accomplished by providing an orifice 82 in the line 58 leading to the main pressure line 10 which, combined with the areas of the "1-2" orifice and orifices 69 and 70, causes pressure from the "Vehicle Driven Pump" to exceed normal line pressure above the mentioned maximum vehicle speed.

When the "Manual Selector Valve" is shifted from neutral to reverse, line pressure is excluded from the "Forward Cylinder" line 15 and "Interlock Valve" line 15a and is admitted to reverse line 16 which communicates through the "Interlock Valve" with the "Reverse Cylinder" line 54, the "Interlock Valve" being held in its right-hand position under the load of spring 48. The initial pressure for engaging the reverse drive train will, as in the case of engaging an initial forward drive train, be limited to the relatively low line pressure established by spring 23 due to the fact that even though line pressure is admitted to passage 16 and branch passage 37, it cannot operate effectively on the top of the "Pressure Control Valve" piston 34 until such piston is initially moved down in response to initial throttle opening. When the throttle is opened and piston 34 moves down to uncover the port 37 admitting pressure to the top of piston 34, a multiplied line pressure, which may be in the order of 160 pounds per square inch, is established adequate to hold the high torque on the reverse friction element of the transmission.

In order to provide a safeguard against shifting into reverse drive when the vehicle is traveling forward above a predetermined low maximum speed, such as 10 miles per hour, the small orifice flat 84 in the "Interlock Valve" controls the flow from the "Vehicle Driven Pump" when the vehicle is in forward motion and the "Manual Selector Valve" is moved to reverse position. The effective area between such orifice flat 84 and the associated land 85 of the valve bore is made such as to cause the pressure from the "Vehicle Driven Pump" to overcome the load of spring 48 shutting off communication between the reverse pressure line 55 and the "Reverse Cylinder" line 54 whenever the vehicle speed is above such predetermined maximum. When the vehicle speed is below such low maximum, the "Interlock Valve" may move to a position establishing communication between the reverse line 55 and "Reverse Cylinder" line 54 while the "Vehicle Pump" discharge is delivered through the mentioned orifice to the governor line 56 from which it may exhaust through the "1-2" orifice and orifices 69 and 70. Thus, while it is possible to shift between reverse and low or forward drive as in rocking the vehicle to get out of mud or snow, it is impossible to shift into reverse when the vehicle is traveling at a forward speed high enough to damage the reverse friction element of the transmission.

A similar provision is incorporated in the "Interlock Valve" to prevent engagement of the "Parking Lock" by shift to parking position whenever the vehicle is traveling at any appreciable forward speed. Thus, with the arrangement of the lands 53 and 86 of the "Interlock Valve," the "Parking Lock" will be held off by pressure from line 51 whenever the "Interlock Valve" is displaced from its closed position to establish any exhaust communication with the governor passage 56. Since there is no other exhaust provision for any fluid delivered from the "Vehicle Pump" (other than the very slight discharge through the adjustable bleed 76 which merely compensates for manufacturing tolerances in the "Vehicle Pump"), a very slight forward movement of the vehicle will be sufficient to develop pressure to overcome the spring load 48 admitting pressure to the "Parking Lock Release."

In order to provide for push starting of the vehicle engine, a one-way check valve 77 under light spring load is provided to permit vehicle pump discharge to communicate from line 58 into the main line 10 where it may be employed for engaging the forward drive friction elements. The load of spring 48 is made sufficiently high, such as in the order of 40 pounds per square inch, to prevent discharge of the "Vehicle Pump" into the governor line 56 until after the engine is started. Since line 51 will communicate with line 52 as soon as the vehicle is under way, pressure from the "Vehicle Pump" in the main line 10 will communicate through passage 78 and the "Interlock Valve" to the top of the "Pressure Control Valve" thereby causing pressure to build up to the value established by the spring 48 which will be adequate to fully engage the friction elements as required for push starting.

In some installations it may be desired to provide for normal starting in second speed drive rather than in first speed as described above. Referring to Fig. 2, a modification of the "Governor Valve" is shown for accomplishing this result. In such modification the valve is held in second speed position by a thimble 90 pressed by spring 91 to a position limited by the engagement of a shoulder 92 in the thimble with a shoulder 93 at the end of a rod 94 anchored in the fixed stop 95. The spring 91 is made adequate to overcome the load of spring 65 in second speed position but yields to line pressure introduced at the left end of the "Governor Valve" when the "Manual Selector Valve" is moved to low speed position thereby permitting a manual shift to low, subject to the limits of predetermined maximum vehicle speed as previously described. In such modification the orifice 70 of Fig. 1 may be omitted since only one shift point is controlled by the differential effect of vehicle speed and throttle opening.

In Fig. 3 a further modification of the governor valve is shown adapting it to a transmission wherein progressive shifts are effected by the engagement of one and coordinated release of another friction element. The valve is shown in first speed position wherein pressure from port 73a is admitted through cross passage 96 and delivery passage 96a into the "First Speed Clutch" port. When the "Governor Valve" is now shifted to second speed position, an annular recess 97 registers with the "First Speed Clutch" port to effect release of the associated friction element. Likewise, when the valve is shifted to third speed position, the annular recess 97 exhausts pressure from the "Second Speed Clutch" port while a second annular recess 98 maintains the "First Speed Clutch" port in communication with its exhaust port. A piston 99, actuated by manual shift to low speed, operates through rod 100 to hold the "Governor Valve" in first speed position as in the other modifications.

Thus it will be seen that a relatively simple control system has been provided which meets all of the objects set forth above and which does not require mechanical connection to any rotating part of the transmission. It will be understood from the above description that the use of orifice means for controlling shift points permits the control system to be adapted to the requirements and characteristics of any automotive vehicle by merely varying the size of drilled orifices. Thus the hysteresis effect between upshifts and downshifts may be increased by merely enlarging the control orifices 69 and 70 or decreased by reducing their size. The "1–2" upshift may be delayed or advanced by increasing or decreasing the size of the "1–2" orifice while the "2–3" shift may likewise be delayed or advanced by merely modifying the size of the "2–3" orifice. Likewise, the effect of throttle opening to advance or delay shifts may be modified to suit the characteristics of a particular automotive vehicle by merely changing the size of the drilled orifices 39.

While a particular preferred embodiment of my invention has been described above in detail, it will be understood that numerous modifications might be resorted to without departing from the scope of the invention as defined in the following claims.

I claim:

1. A fluid pressure control system for an automotive vehicle automatic transmission wherein ratio changes are effected by controlled admission and release of fluid pressure to and from fluid pressure actuated means, characterized by a source of fluid pressure, passages for connecting said means to said source and alternately to exhaust, fluid pressure responsive valve means interposed in said passages movable to substantially spaced positions on either side of a dead center position for establishing positive admission and positive release of ratio changing fluid pressure from said source to and from said fluid pressure actuated means, a source of continuously delivered fluid volume varying with speed, orifice discharge means for said latter fluid providing a regulated fluid pressure varying with speed, said valve means being progressively actuated by said latter regulated fluid pressure, and means for producing sudden movement of said valve between said substantially spaced positions.

2. Control means as set forth in claim 1 wherein said last-named means for producing sudden movement of said valve means comprises means for decreasing the effective area of said orifice discharge means responsive to progressive movement of said valve means under increasing fluid pressure.

3. Control means as set forth in claim 1 wherein said last-named means for producing sudden movement of said valve means comprises means for decreasing the effective area of said orifice discharge means responsive to progressive movement of said valve under increasing fluid pressure, said latter means being constructed to produce a substantial hysteresis effect in the reverse movement of said valve in response to a drop in speed.

4. In a fluid pressure control system for an automotive vehicle automatic transmission, a positive displacement pump having a fluid discharge varying with vehicle speed, a governor valve movable from a position corresponding to a relatively low speed drive to a position for establishing a relatively higher speed drive, means for increasingly resisting said valve's progressive movement toward said higher speed position, fluid discharge from said pump urging said valve toward said relatively higher speed position, orifice discharge means for said fluid providing a fluid pressure acting on said valve increasing with vehicle speed, and means responsive to movement of said governor valve toward said higher speed position for reducing the effective area of said orifice means to provide a sudden increase in pressure and sudden movement of said valve to said higher speed position.

5. In a fluid pressure control system for an automotive vehicle automatic transmission, a positive displacement pump having a fluid discharge varying with vehicle speed, a governor valve movable from a position corresponding to a relatively low speed drive to a position for establishing a relatively higher speed drive, means for increasingly resisting said valve's progressive movement toward said higher speed position, fluid discharge from said pump urging said valve toward said relatively higher speed position, orifice discharge means for said fluid providing a fluid pressure acting on said valve increasing with vehicle speed, and means responsive to movement of said governor valve toward said higher speed position for reducing the effective area of said orifice means to provide a sudden increase in pressure and sudden movement of said valve to said higher speed position, and additional orifice discharge means opened by said valve's movement to said higher speed position for stopping said valve at said higher speed position.

6. In a fluid pressure control system for an automotive vehicle automatic transmission, a positive displacement pump having a fluid discharge varying with vehicle speed, a governor valve progressively movable from a position corresponding to a relatively low speed drive position to an intermediate position for establishing an intermediate speed drive and a further position for establishing a relatively high speed drive, means for increasingly resisting said valve's movement toward said higher speed positions, orifice discharge means for said fluid providing a control pressure increasing with vehicle speed, means responsive to the movement of said valve from said low speed position toward said intermediate speed position for decreasing effective orifice discharge area to provide a sudden increase in pressure for completing said valve's movement to said intermediate speed position, orfice discharge means opened by the completion of said valve's movement to said intermediate position for stopping said valve's movement at said intermediate speed position pending a predetermined further increase in vehicle speed, means responsive to said valve's further movement from said intermediate position toward said relatively high speed position to again reduce the effective orifice discharge area providing another sudden increase in pressure to complete said valve's movement to said relatively high speed position.

7. Control means as set forth in claim 6 wherein said means for resisting valve movement comprises a constant rate spring.

8. In a fluid pressure control system for an automotive vehicle automatic transmission, a positive displacement pump having a fluid discharge varying with the speed of a rotating element of the transmission, and means for producing a fluid control pressure increasing with said speed and decreasing with power demand comprising progressive orifice discharge means, means responsive to increasing power demand for progressively opening said orifice discharge means to exhaust said fluid, shift control means responsive to said source of pressure comprising a governor valve progressively movable toward a higher speed ratio position actuated by said pressure, means for increasingly resisting said governor valve's movement toward said higher speed ratio position, orifice discharge means associated with said governor valve for exhausting said fluid, and means responsive to said governor valve's movement toward higher speed ratio position for decreasing the effective discharge area of said latter orifice means to produce a regenerative increase in effective pressure exceeding the increasing resistance to said movement and thereby producing sudden movement of said governor valve to said higher speed ratio position without further increase in speed.

9. In a fluid pressure control system for an automotive vehicle automatic transmission, a positive displacement pump having a fluid discharge varying with the speed of a rotating element of the transmission, and means for producing a fluid control pressure increasing with said speed and decreasing with power demand comprising progressive orifice discharge means, means responsive to increasing power demand for progressively opening said orifice discharge means to exhaust said fluid, shift control means responsive to said source of pressure comprising a governor valve progressively movable toward a higher speed ratio position actuated by said pressure, means for increasingly resisting said governor valve's movement toward said higher speed ratio position, orifice discharge means associated with said governor valve for exhausting said fluid, means responsive to said governor valve's movement toward higher speed ratio position for decreasing the effective discharge area of said latter orifice means to produce a regenerative increase in effective pressure exceeding the increasing resistance to said movement and thereby producing sudden movement of said governor valve to said higher speed ratio position without further increase in speed, and additional orifice discharge means associated with said governor valve opened by the movement of said governor valve to said higher speed ratio position.

10. In a fluid pressure control system for an automotive vehicle automatic transmission having drive established by engagement of fluid pressure actuated friction coupling means and also including a hydrodynamic coupling, a source of fluid pressure, a pressure control valve for modulating said pressure to a value suitable for engaging said friction coupling means, said valve including a discharge port opened by said modulated pressure, said discharge port communicating with said hydrodynamic coupling, piston means of differential area acted upon at one end by said modulated pressure and at the other end by said hydrodynamic coupling pressure, and an exhaust port opened by said differential piston means when said hydrodynamic coupling pressure reaches a fractional value of said modulated pressure proportional to said differential areas.

11. In a fluid pressure control system for an automotive vehicle automatic transmission having a gear train engaged by fluid pressure actuated friction coupling means, a manual selector valve movable from a neutral to a drive position to admit drive engaging fluid pressure to said coupling means, an engine throttle for regulating engine torque, an accelerator control for said throttle, a source of pressure, pressure control means for regulating said pressure to a relatively low value appropriate for smooth closed throttle engagement of said gear train, means responsive to progressive accelerator actuation for increasing said pressure as required to hold said friction coupling means engaged under acceleration torque loads, and means responsive to initial vehicle movement for maintaining a relatively high pressure as long as said manual control remains in drive range notwithstanding the return of said accelerator closing said throttle.

12. In a fluid pressure control system for an engine driven automotive vehicle automatic transmission having a gear train engaged by fluid pressure actuated friction coupling means subjected to maximum torque loads decreasing with increasing engine speeds, a source of pressure, means for regulating said pressure to a value required for holding said friction coupling means engaged under accelerating torque loads, and means responsive to increasing engine speed for reducing said pressure in accordance with reduced maximum torque loads on said friction coupling means.

13. In a fluid pressure control system for an engine driven automotive vehicle automatic transmission having a gear train engaged by fluid pressure actuated friction coupling means subjected to maximum torque loads decreasing with increasing engine speeds, a source of pressure, means for regulating said pressure to a value required for holding said friction coupling means engaged under accelerating torque loads, and means responsive to increasing engine speed for reducing said pressure in accordance with reduced maximum torque loads on said friction coupling means, said last means comprising a positive displacement fluid pump having a delivery increasing with engine speed, a venturi passage in the delivery passage of said pump, a pressure control valve responsive to the pressure in said delivery passage, and fluid pressure means communicating with said venturi passage for varying the loading of said pressure control valve in accordance with the rate of flow through said venturi passage.

14. In a fluid pressure control system for an automotive vehicle automatic transmission having a drive train engaged by fluid pressure actuated friction coupling means, an engine driven pump, a vehicle driven pump, a pressure line normally supplied with fluid from said engine driven pump for actuating said friction coupling means, a governor line normally supplied with fluid from said vehicle driven pump for controlling the speed ratio of said transmission, means for blocking vehicle pump fluid from said governor line when said engine is not running, and means for admitting fluid from said vehicle pump to said first pressure line for effecting engagement of said friction coupling means in push starting said engine.

15. In a fluid pressure control system for an automotive vehicle automatic transmission having progressive forward drive trains respectively engaged by fluid pressure actuated friction coupling means, a vehicle driven pump delivering fluid when said vehicle moves in a forward direction, orifice means for discharging said fluid providing regulation for a fluid control pressure varying with vehicle speed, automatic shift control means responsive to said control pressure, and manual shift means for producing a forced downshift to a relatively lower speed ratio, said control pressure at vehicle speeds above a predetermined maximum preventing said manual forced downshift.

16. In a fluid pressure control system for an automotive vehicle automatic transmission, a positive displacement pump having a fluid discharge varying with vehicle speed, a governor valve movable from a position corresponding to a relatively low speed drive to a position for establishing a relatively higher speed drive, means for increasingly resisting said valve's progressive movement toward said higher speed position, fluid discharge from said pump urging said valve toward said relatively higher speed position, orifice discharge means for said fluid providing a fluid pressure acting on said valve increasing with vehicle speed, means responsive to movement of said governor valve toward said higher speed position for reducing the effective area of said orifice means to provide a sudden increase in pressure and sudden movement of said valve to said higher speed position, and exhaust discharge means opened by said valve's movement beyond highest speed position adapted to discharge any increased volume delivered by said pump without appreciable rise in governor pressure or movement of governor valve.

17. In combination with control means as set forth in claim 6, driver operated means for varying power demand, and progressive orifice discharge means opened with increasing power demand for reducing said control pressure.

18. In combination with control means as set forth in claim 6, driver operated means for varying power demand, and progressive orifice discharge means opened with increasing power demand for reducing said control pressure, and additional orifice discharge means of different effective area for different prevailing speed ratios opened with extreme power demand for effecting a forced downshift, said different effective areas being adapted to limit said forced downshifts to different maximum vehicle speeds for respective prevailing speed ratios.

19. In a fluid pressure control system for an automotive vehicle automatic transmissing having a manually releasable parking lock, a fluid pressure actuated parking lock hold-off, a vehicle driven pump delivering fluid when said vehicle is moving in a forward direction, exhaust port means for normally exhausting the discharge of said vehicle driven pump, means for blocking said exhaust port means when said vehicle is stationary, said last means being yieldable to fluid pressure delivered from said vehicle driven pump when said vehicle is moving, and means responsive to displacement of said yieldable means resulting from vehicle movement for actuating said parking lock hold-off, said last means including a source of pressure established independently of vehicle movement.

20. In a transmission for engine-driven vehicles, means for establishing a plurality of drive ratios; fluid pressure servo means for actuating the ratio-determining means; a source of fluid under pressure adapted to be connected to the servo means; means including a fluid pressure controlled shift valve for controlling the connection between the source and the servo means; and means for maintaining different ranges of pressure of said source in response to establishment of different drive ratios including a pressure regulator valve for the source, means including an accelerator pedal controlled pressure metering valve for controlling the pressure regulator valve selectively to establish a plurality of pressure ranges, and means responsive to the position of the fluid pressure controlled shift valve and associated with said pressure metering valve for selecting the pressure range established by the regulator valve.

21. In a fluid pressure control system for an automotive vehicle automatic transmission, a positive displacement pump having a fluid discharge varying with the speed of a rotating element of the transmission, means for producing a fluid control pressure increasing with said speed and decreasing with power demand comprising progressive orifice discharge means, means responsive to increasing power demand for progressively opening said orifice discharge means to exhaust said fluid, shift control means responsive to said source of pressure, comprising a governor valve progressively movable toward a higher speed ratio position actuated by said pressure, means for increasingly resisting said governor valve's movement toward said higher speed ratio position, a manual selector valve movable to relatively high and low speed positions, and means responsive to the movement of said manual selector valve to a relatively low speed position for moving said governor valve to a corresponding low speed position against the force of said fluid control pressure.

22. In a fluid pressure control system for an automotive vehicle automatic transmission, a positive displacement pump having a fluid discharge varying with the speed of a rotating element of the transmission, means for producing a fluid control pressure increasing with said speed and decreasing with power demand comprising progressive orifice discharge means, means responsive to increasing power demand for progressively opening said orifice discharge means to exhaust said fluid, shift control means responsive to said source of pressure, comprising a governor valve progressively movable toward a higher speed ratio position actuated by said pressure, means for increasingly resisting said governor valve's movement toward said higher speed ratio position, a manual selector valve movable to relatively high and low speed positions, means responsive to the movement of said manual selector valve to a relatively low speed position for moving said governor valve to a corresponding low speed position against the force of said fluid control pressure, said last means having a limited actuating force, and means for causing said fluid control pressure to exceed said limited force at speeds above a predetermined maximum vehicle speed.

23. In a fluid pressure control system for an automotive vehicle automatic transmission, a positive displacement pump having a fluid discharge varying with the speed of a rotating element of the transmission, means for producing a fluid control pressure increasing with said speed and decreasing with power demand comprising progressive orifice discharge means, means responsive to increasing power demand for progressively opening said orifice discharge means to exhaust said fluid, shift control means responsive to said source of pressure, comprising a governor valve progressively movable toward a higher speed ratio position actuated by said pressure, means for increasingly resisting said governor valve's movement toward said higher speed ratio position, said governor valve being movable to a plurality of higher speed ratio positions, and yieldable means for moving said governor valve to a position for establishing a normal starting ratio above lowest speed ratio.

24. In a fluid pressure control system for an automotive vehicle automatic transmission, a positive displacement pump having a fluid discharge varying with the speed of a rotating element of the transmission, means for producing a fluid control pressure increasing with said speed and decreasing with power demand comprising progressive orifice discharge means, means responsive to increasing power demand for progressively opening said orifice discharge means to exhaust said fluid, shift control means responsive to said source of pressure, comprising a governor valve progressively movable toward a higher speed ratio position actuated by said pressure, means for increasingly resisting said governor valve's movement toward said higher speed ratio position, said governor valve being movable to a plurality of higher speed ratio positions, yielding means for moving said governor valve to a position for establishing a normal starting ratio above lowest speed ratio, a manual selector valve and means responsive to movement of said manual selector valve to a relatively low speed ratio position for moving said governor valve against said yieldable means to a corresponding relatively low speed ratio position.

25. In a fluid pressure control system for an automotive vehicle automatic transmission, a positive displacement pump having a fluid discharge varying with the speed of a rotating element of the transmission, means for producing a fluid control pressure increasing with said speed and decreasing with power demand comprising progressive orifice discharge means, means responsive to increasing power demand for progressively opening said orifice discharge means to exhaust said fluid, comprising a valve adapted for movement under the control of the driver of the vehicle, additional orifice discharge means being opened in response to the movement of said valve beyond a substantially open throttle position, and means for rendering the effective area of said last-named orifice discharge means of different magnitude for different prevailing speed ratios.

References Cited in the file of this patent

UNITED STATES PATENTS

| | | |
|---|---|---|
| 2,102,781 | Bieretz | Dec. 21, 1937 |
| 2,203,296 | Fleischel | June 4, 1940 |
| 2,204,872 | Thompson | June 18, 1940 |
| 2,260,406 | Roche | Oct. 28, 1941 |
| 2,352,212 | Lang et al. | June 27, 1944 |
| 2,416,154 | Chilton | Feb. 18, 1947 |
| 2,430,799 | Aspinwall | Nov. 11, 1947 |
| 2,456,132 | Lapsley | Dec. 14, 1948 |
| 2,516,203 | Greenlee et al. | July 25, 1950 |
| 2,516,208 | Hasbany | July 25, 1950 |
| 2,523,726 | Seeger | Sept. 26, 1950 |
| 2,590,231 | Chilton | Mar. 25, 1952 |
| 2,595,969 | McFarland | May 6, 1952 |
| 2,599,215 | Wemp | June 3, 1952 |
| 2,604,197 | Livermore | July 22, 1952 |
| 2,606,456 | Dodge | Aug. 12, 1952 |
| 2,627,189 | McFarland | Feb. 3, 1953 |
| 2,633,035 | Livermore | Mar. 31, 1953 |
| 2,766,639 | Rosenberger | Oct. 16, 1956 |
| 2,794,349 | Smirl | June 4, 1957 |
| 2,815,684 | Roche | Dec. 10, 1957 |